United States Patent
Chiu et al.

(10) Patent No.: US 10,025,712 B2
(45) Date of Patent: *Jul. 17, 2018

(54) POWER-SAFE DATA MANAGEMENT SYSTEM

(71) Applicant: Western Digital Technologies, Inc., Irvine, CA (US)

(72) Inventors: Lyndon S. Chiu, Irvine, CA (US); Frederick H. Adi, Costa Mesa, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,955

(22) Filed: Jun. 6, 2016

(65) Prior Publication Data

US 2016/0357670 A1     Dec. 8, 2016

Related U.S. Application Data

(63) Continuation of application No. 13/073,588, filed on Mar. 28, 2011, now Pat. No. 9,361,044.

(51) Int. Cl.
| | |
|---|---|
| *G06F 12/00* | (2006.01) |
| *G06F 12/0804* | (2016.01) |
| *G06F 12/02* | (2006.01) |
| *G06F 3/06* | (2006.01) |
| *G06F 11/14* | (2006.01) |

(52) U.S. Cl.
CPC ........ *G06F 12/0804* (2013.01); *G06F 3/0619* (2013.01); *G06F 3/0647* (2013.01); *G06F 3/0659* (2013.01); *G06F 3/0685* (2013.01); *G06F 3/0689* (2013.01); *G06F 11/1441* (2013.01); *G06F 12/0246* (2013.01); *G06F 2212/1032* (2013.01); *G06F 2212/2022* (2013.01)

(58) Field of Classification Search
CPC .................................................. G06F 12/0246
USPC .................................................. 711/103, 115
See application file for complete search history.

(56) References Cited

U.S. PATENT DOCUMENTS

| | | | |
|---|---|---|---|
| 6,170,066 | B1 | 1/2001 | See |
| 6,311,290 | B1 | 10/2001 | Hasbun et al. |
| 6,513,095 | B1 | 1/2003 | Tomori |
| 6,856,556 | B1 | 2/2005 | Hajeck |

(Continued)

FOREIGN PATENT DOCUMENTS

EP      1560224 A2    8/2005

OTHER PUBLICATIONS

Kang et.al. "A Superblock-based Flash Translation Layer for NAND Flash Memory" Oct. 22-25, 2006, ACM.

*Primary Examiner* — Tuan Thai
*Assistant Examiner* — Tasnima Matin
(74) *Attorney, Agent, or Firm* — McDermott Will & Emery LLP

(57) ABSTRACT

Embodiments of the invention include systems and methods for recovering the system status and maintaining drive coherency after an unexpected power loss. In particular, these systems and methods reduce overhead for maintaining drive coherency by providing for pre-allocation of groups of write addresses and recording the pre-allocated groups of addresses to the non-volatile memory. Write processes can write to the pre-allocated group of addresses while the next group of addresses are pre-allocated and recorded to non-volatile memory.

14 Claims, 5 Drawing Sheets

(56) References Cited

U.S. PATENT DOCUMENTS

| | | |
|---|---|---|
| 6,970,890 B1 | 11/2005 | Bruce et al. |
| 7,126,857 B2 | 10/2006 | Hajeck |
| 7,313,030 B2 | 12/2007 | Lohse et al. |
| 7,430,136 B2 | 9/2008 | Merry, Jr. et al. |
| 7,447,807 B1 | 11/2008 | Merry et al. |
| 7,457,910 B2 | 11/2008 | Chang et al. |
| 7,472,309 B2 | 12/2008 | Bangalore |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,890,529 B1 | 2/2011 | Srinivasan et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,745,277 B2 | 6/2014 | Kan |
| 9,268,646 B1 | 2/2016 | Chiu et al. |
| 9,361,044 B2 | 6/2016 | Chiu et al. |
| 2004/0103238 A1 | 5/2004 | Avraham et al. |
| 2005/0144360 A1 | 6/2005 | Bennett et al. |
| 2006/0053139 A1 | 3/2006 | Marzinski et al. |
| 2007/0005928 A1 | 1/2007 | Trika et al. |
| 2007/0113029 A1 | 5/2007 | Bennett et al. |
| 2007/0156998 A1 | 7/2007 | Gorobets |
| 2007/0204128 A1 | 8/2007 | Lee et al. |
| 2008/0104308 A1 | 5/2008 | Mo et al. |
| 2008/0162786 A1 | 7/2008 | Shanmuganathan |
| 2008/0250223 A1 | 10/2008 | Torabi |
| 2008/0282025 A1 | 11/2008 | Biswas et al. |
| 2009/0150599 A1 | 6/2009 | Bennett |
| 2009/0172257 A1 | 7/2009 | Prins et al. |
| 2009/0271562 A1 | 10/2009 | Sinclair |
| 2009/0327589 A1 | 12/2009 | Moshayedi |
| 2010/0174849 A1 | 7/2010 | Walston et al. |
| 2010/0250793 A1 | 9/2010 | Syu |
| 2011/0072199 A1 | 3/2011 | Reiter et al. |
| 2011/0099323 A1 | 4/2011 | Syu |
| 2011/0283049 A1 | 11/2011 | Kang et al. |
| 2012/0254503 A1 | 10/2012 | Chiu et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0115427 A1 | 4/2014 | Lu |
| 2014/0133220 A1 | 5/2014 | Danilak et al. |
| 2014/0136753 A1 | 5/2014 | Tomlin et al. |

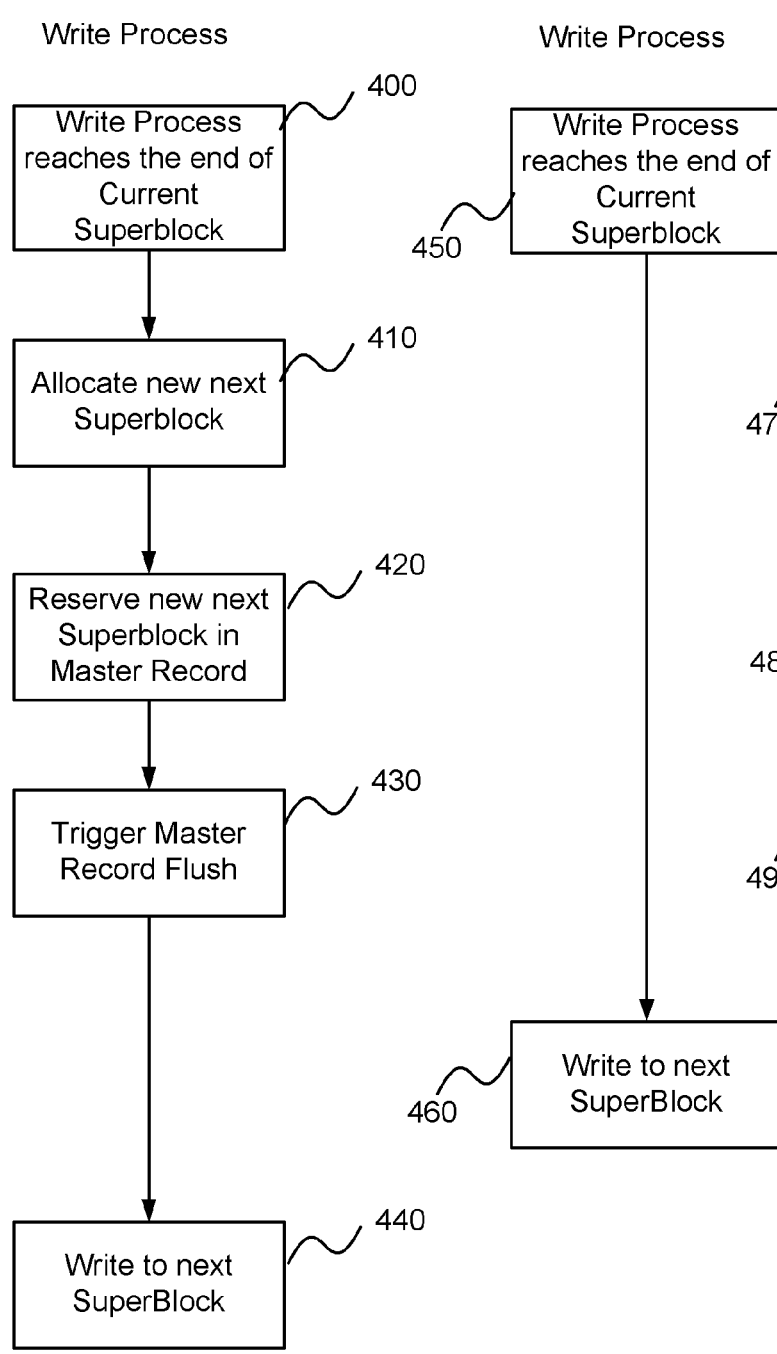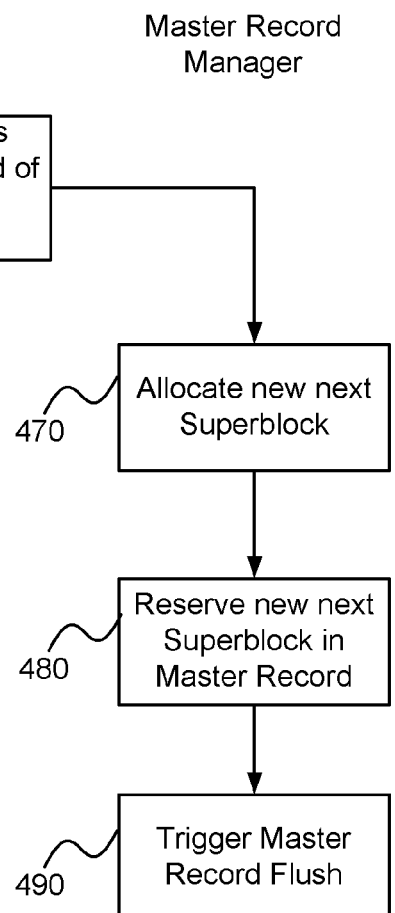
Fig. 4A
Fig. 4B

POWER-SAFE DATA MANAGEMENT SYSTEM

CROSS-REFERENCE TO RELATED APPLICATIONS

The present application claims the benefit of priority under 35 U.S.C. § 120 as a continuation of U.S. patent application Ser. No. 13/073,588 entitled "Power-Safe Data Management System," filed on Mar. 28, 2011, the disclosure of which is hereby incorporated by reference in its entirety for all purposes.

BACKGROUND

Solid-state storage drives allow for very fast read-write times to a solid-state storage media. Processing speeds on a controller in the solid-state drive can therefore have a noticeable impact on read-write throughput. Solid-state drives must also maintain data coherency within a solid-state storage system. If the solid-state storage system loses power suddenly, it must be able to recover to a usable state and be able to maintain, for example, which portions of memory are safe to write to and which are currently being written by write processes.

BRIEF DESCRIPTION OF THE DRAWINGS

Systems and methods which embody the various features of the invention will now be described with reference to the following drawings, in which:

FIGS. 2B, 4A and 4B show flowcharts for managing a master record according to embodiments.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

System Overview

Embodiments of the invention are directed to systems and methods for reducing read-write delays by a controller on a non-volatile storage system while maintaining a record of system activity in non-volatile memory for recovery purposes. In embodiments, the record of system activity can be used to restore system status and maintain coherency in the event of a power loss.

As used in this application, "non-volatile memory" typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of this disclosure.

In this disclosure, the term "superblock" is defined as a group of addresses on non-volatile storage media. This grouping of addresses can refer broadly to any method of grouping addresses together (e.g., page, blocks, etc.). In some embodiments, these groupings can include at least one block of write addresses from a plurality of dies in non-volatile storage media. In some embodiments, these groupings can be used by a controller to efficiently organize data access operations and manage the non-volatile storage system.

Figure 1:
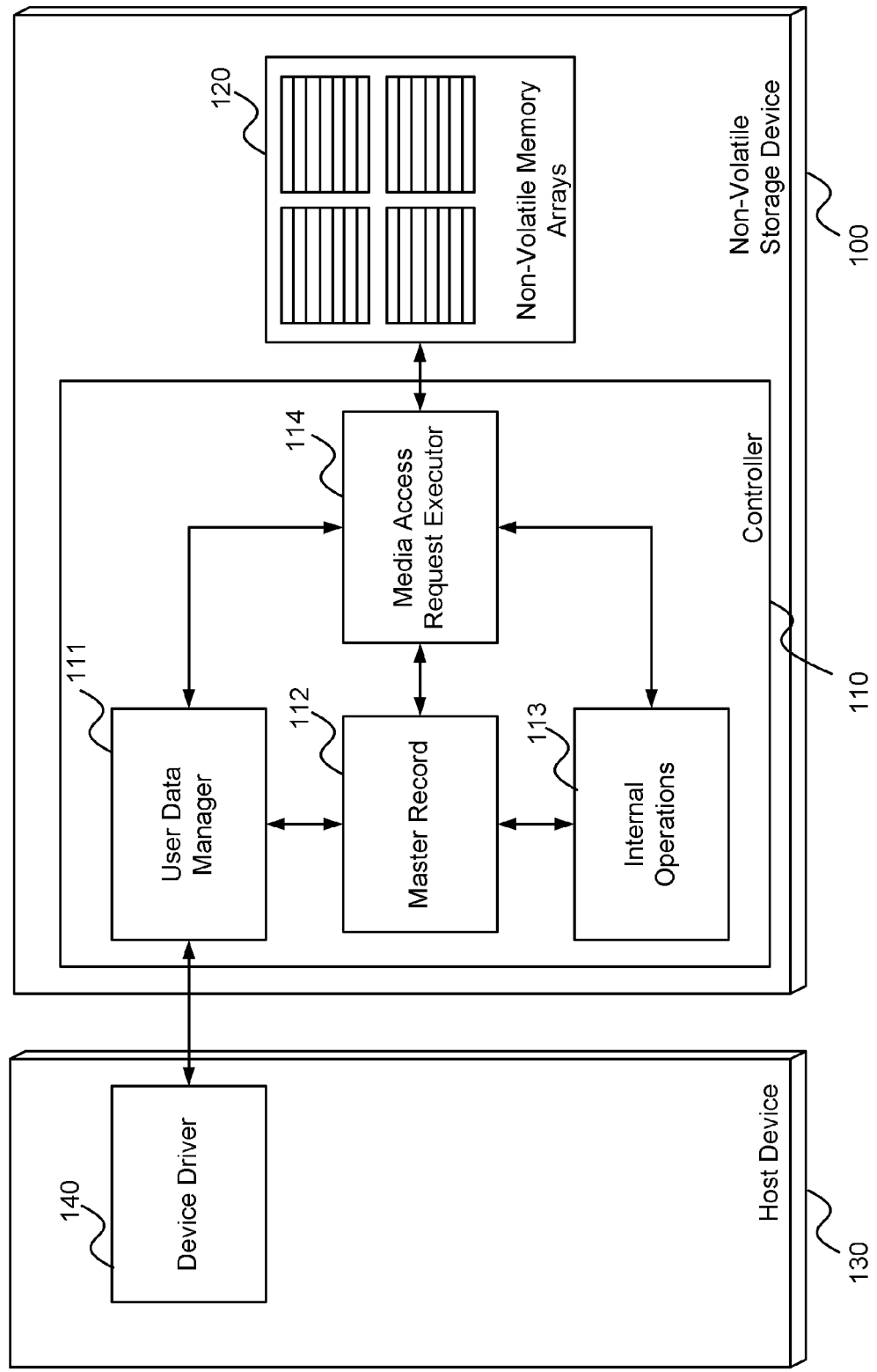
FIG. 1 shows an overview of a non-volatile storage device.

Referring to FIG. 1, a system diagram shows a non-volatile storage device 100 in communication with a host device 130 according to an embodiment. As depicted in this embodiment, a non-volatile storage device 100 can include non-volatile memory arrays 120 and a controller 110. The controller 110 is in communication with the non-volatile memory arrays 120 and with the host device 130. The controller in this embodiment includes a user data manager 111, a master record 112, an internal operations manager 113, and a media access request executor 114. The user data manager 111 is in communication with a device driver 140 on the host device 130 and can receive and process memory requests from a device driver 140 on the host device. The internal operations manager 113 can include system clean up and maintenance tasks, such as garbage collection and wear leveling operations for maintaining the non-volatile memory arrays 120. The arrays 120 may comprise a plurality of solid-state storage devices coupled to the controller 110. The arrays may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Media access requests can be sent from the user data manager 111 or internal operations manager 113 to the media access request executor 114 for execution on non-volatile memory arrays 120. In one embodiment, the media access request executor 114 schedules command execution on the non-volatile memory arrays and is responsible for any remaining translation tasks to execute a command on blocks of memory in the non-volatile memory arrays 120. When the user data manager 111 or internal operations manager 113 perform a write command, the write command may be executed on a superblock designated for the next writes for the write command. Each superblock may designate a selection of blocks from a plurality of physical dies on the non-volatile memory array for write commands. During operation of the controller 110, each write entity, such as the user data manager 111 and internal operations manager 113, may have associated with it a running process that is assigned a superblock. As each process completes writing to addresses in its assigned superblock, it may transition to another superblock to continue writing to the non-volatile memory arrays 120.

The master record 112 can maintain the status of operations within the controller 110. For example, the master record 112 can maintain the superblock(s) assigned to each write process. In one embodiment, the master record 112 resides in volatile memory. Therefore, in an embodiment the master record 112 may be periodically flushed (e.g., by the controller or a write process executed on the controller, via a write command to the media access request executor 114) so that its information is saved to the non-volatile memory arrays 120. In one embodiment, the information kept in the master record 112 should be sufficient such that in the event of a power loss, the system can recover an operating state while maintaining data coherency.

Record Processing

Figure 2A:
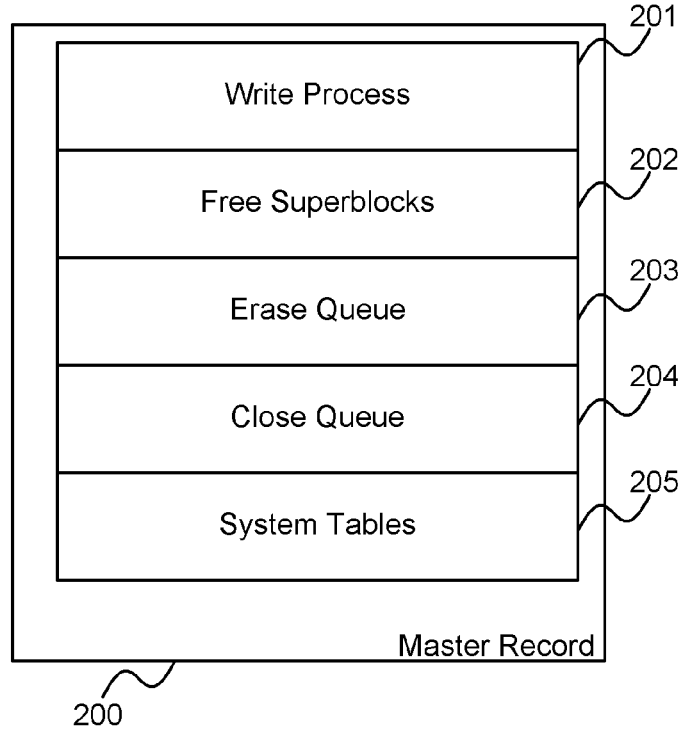
FIGS. 2A, 3A and 3B show the contents of a master record for recording system status according to embodiments.

FIG. 2A depicts a master record 200 according to an embodiment. The master record includes data which can record the operating status of the device. In the embodiment depicted in FIG. 2A, the master record 200 includes information about a write process 201. The write process can include a process initiated by the user data manager, internal operations manager or any other process on which can issue write commands to the non-volatile storage array. As used herein, a "process" may refer to a thread executed on a processor of the controller, and several threads may be concurrently executed on the same processor. Though data regarding a single write process is depicted here, the master record may maintain data for all write processes executed by the controller. This data about the write process 201 can include the superblock(s) designated to the process. In addition, the master record can maintain a free pool 202, reflecting superblocks which are available for use by write processes. When a superblock is allocated to a write process, it is removed from the free pool to reflect it is no longer available for other processes. Data reflecting an erase queue 203 can indicate superblocks which are in a queue to be erased from the non-volatile storage arrays. When the non-volatile storage array has successfully erased a superblock, that superblock may be removed from the erase queue 203 and placed in the free pool 202. The erase queue thus ensures data integrity because if power is lost while a superblock erase is in process, the erase will be re-initiated after power is restored. The master record 200 may also include a close queue 204, reflecting superblocks which have completed writing, but may still require additional checks or actions after a write process completes writing to the superblocks. The master record 200 may also include system tables 205, which can include a record of system status, such as corrupted blocks in the non-volatile memory array, a translation table, a mapping table, and/or other system tables. In one embodiment, the length of each superblock is also saved in the master record. A superblock may include 2,048 pages in one embodiment, though those skilled in art would appreciate that any number of pages (or other storage elements) may be included in a superblock.

Figure 2B:
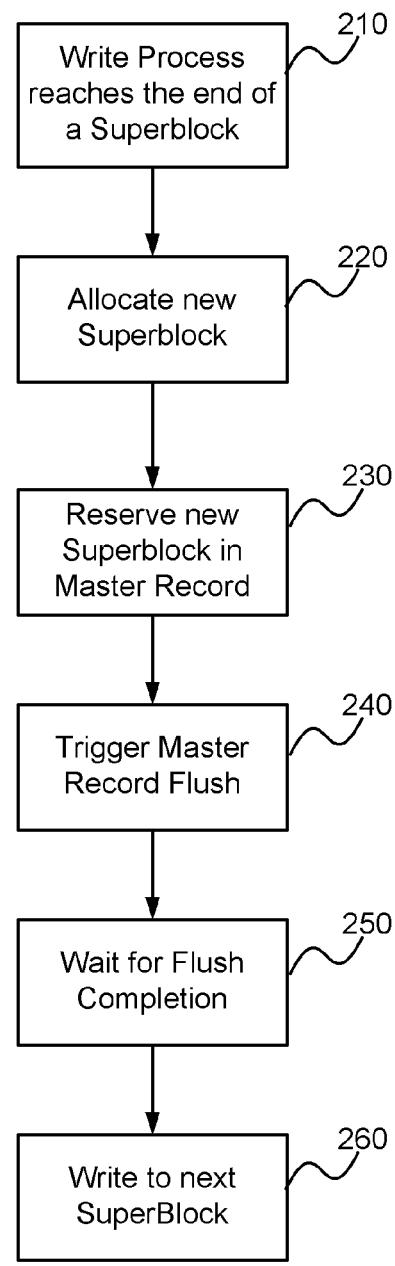

The flowchart shown in FIG. 2B shows an embodiment of the method performed by a write process in conjunction with the master record shown in FIG. 2A. At block 210, the write process reaches the end of the superblock designated for the process. At block 220, the process allocates a new superblock for the subsequent writes from the free pool. At block 230, the process reserves the newly allocated superblock in the master record. At block 240, the process triggers a flush of the master record (with information on the newly allocated superblock) to the non-volatile memory. At block 250, the process waits for the master record flush to complete. The process waits for the flush to complete prior to writing to the subsequent block because if the process writes prior to the flush and the system is forced to revert to a copy of the master record in the non-volatile memory saved prior to the flush (for example, after a power loss), the record in non-volatile memory will not reflect that the write process is set to write to the subsequent block. The previously saved copy would still indicate that the write process is writing to the superblock that was being written to prior to block 210. Waiting until the master record with updated information on the newly allocated superblock has been flushed to the non-volatile memory thus ensures proper recovery after power loss. After the master record has been flushed to the non-volatile storage, the process can write to the new superblock at block 260, In one embodiment, the write process is executed by the controller 110 depicted in FIG. 1.

Pre-Allocation of Superblocks

Figure 3A:
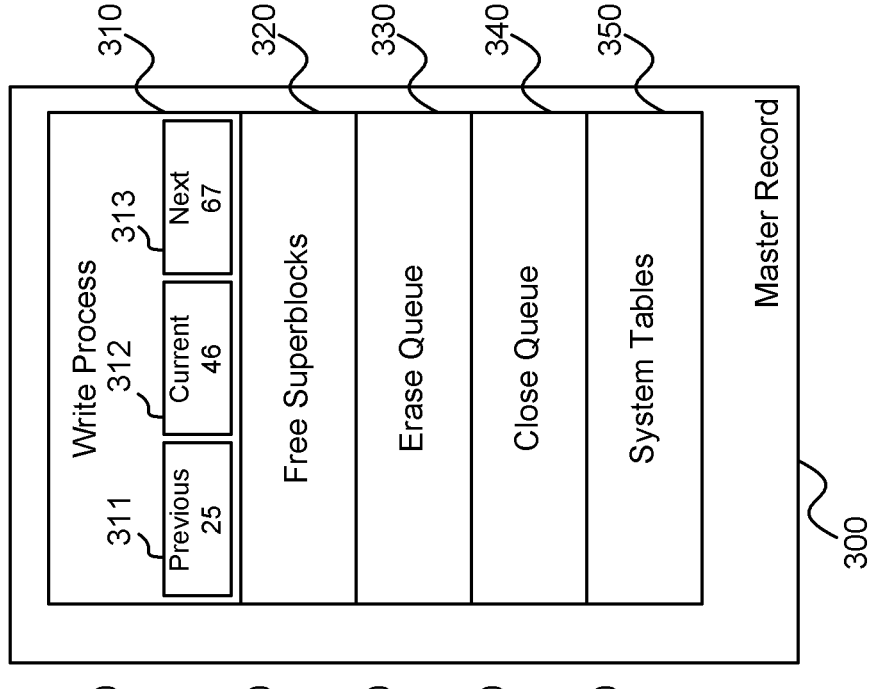
Figure 3B:
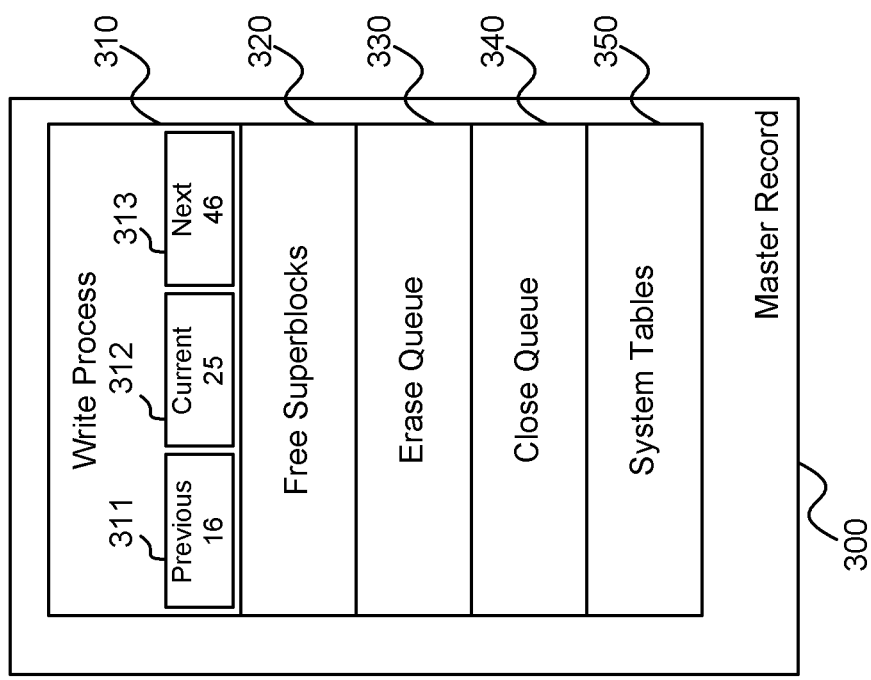

While the waiting in block 250 ensures proper data recovery, the wait time incurred while flushing increases system overhead and reduces performance. The description and referenced figures below describe embodiments that eliminate or reduce the waiting while the master record is flushed. The elimination of the wait is made possible in one embodiment by a master record configuration involving the pre-allocation and tracking of groups of write addresses, as shown in FIGS. 3A and 3B. The performance-enhancing embodiments described herein may be selectively applied to processes that are performance-sensitive/critical. For example, the controller may be configured to apply these embodiments to write processes initiated by the user data manager and/or for garbage collection only. For other processes that are not deemed to be performance-sensitive/critical, the embodiments depicted in FIGS. 2A and 2B may be used. In this embodiment, as shown in FIG. 3A, the write process data 310 includes data related to several allocated superblocks. In this embodiment, the write process data 310 maintains data related to a previous superblock 311, a current superblock 312, and next superblock 313. In this figure, previous superblock 311 indicates that superblock "16" was the last completed superblock that has been written. Current superblock 312 indicates that superblock "25" is the superblock presently designated to be written to by the process. Next superblock 313 indicates that superblock "46" is the group of addresses to be written after completion of writing to the current superblock 312. When the process completes writing to the superblock designated the current superblock 312, the process can continue to write to the block designated next superblock 313, and rotate the corresponding superblocks in the master record 300. The other components 320, 330, 340, and 350 are the same as previously described above in FIG. 2A (202, 203, 204, and 205). The System Tables 350 may also include data reflecting a current and next superblock for system operations, as well as an activity log.

FIG. 3B reflects the status of the master record 300 after the process has rotated the allocated superblocks. The rotation may occur upon the write process reaching the end of the current superblock and is slated to begin writing to addresses in the next superblock. As shown, previous superblock 311 now holds a selection value of "25" which was previously in current superblock 312. Current superblock 312 now holds a value of "46," which was previously a value associated with the next superblock 313. Next superblock 313 now holds a newly allocated superblock with a value of "67." Superblock "67" may be taken from the free pool 320, as described above.

In this embodiment, superblocks are pre-allocated to a write process prior to the write process completing writes to the current superblock. In this way, the record reflects the future selection to be written by the write process. Pre-allocating a future superblock to a write process in the master record has several benefits. Upon reaching the end of the current superblock, the write process can immediately write to the next superblock and does not need to wait for the allocation of a new superblock before continuing to write, if the power is lost after the write process has begun writing to the next superblock but before the master record is updated and flushed to non-volatile memory, the master record can recover the system status and determine where the write process last wrote by referencing the current and next superblocks. Also, in one embodiment, the controller is configured to periodically flush the master record to the non-volatile memory independent of whether a write process has reached into a new superblock. In an embodiment, the master record is periodically flushed at a higher frequency than the occurrence of a process finishing up writing a new superblock. This enables the elimination of the above-referenced wait time, as will be further illustrated below by the processes depicted in FIGS. 4A and 4B. Additionally, maintaining the previous superblock allows it to be used by a logging process to log activity completed by a write process but was not logged prior to power loss, as further explained below in FIGS. 5A and 5B.

Referring to FIGS. 4A and 4B, embodiments for a method used by the write process are shown which are compatible with the master record as shown in FIGS. 3A and 3B. As shown in FIG. 4A at block 400, the write process reaches the end of the current superblock. The write process continues at block 410 to allocate a new next superblock from the free pool. This may trigger a flush of the free pool in some embodiments. At block 420, the write process designates, within the master record, the next superblock as the current superblock, and allocates a superblock as the new next superblock (a rotation process previously shown in the example in FIGS. 3A and 3B), As such, the write process records the new write process status in the master record at block 420. At block 430, the write process triggers a flush of the master record to non-volatile storage. At block 440, the write process can write to what was slated to be the next superblock at the start of the process (the superblock that has just been designated as the current) without waiting for the flush to complete.

As shown in FIG. 4B, the superblock allocation process does not need to be performed by the write process. In the embodiment shown in FIG. 4B, a separate master record manager manages the allocation of superblocks and the management of data related to those blocks maintained in the master record. The master record manager may be a component within the controller 110 in FIG. 1, or a process executed by the controller 110. At block 450, the write process reaches the end of the current superblock. The write process can send a signal to the master record manager indicating that it has completed writing to the current superblock. The write process can then immediately write to the next superblock at block 460 (since the next superblock has already been allocated within the master record). The master record manager receives the signal from the write process at block 470 and allocates a new superblock for the write process, which is then designated as the new next superblock. The new next superblock is reserved in the master record at block 480 and the master record manager can trigger a master record flush at block 490. In an embodiment, the flush may be performed right after a superblock is reserved (as shown in the figure), periodically after every Nth write, or when a set number of write processes have reserved new next superblocks. The write process can obtain the new next superblock either by referencing the master record or by being passed the new superblock from the master record manager. In one embodiment, the write process depicted in FIGS. 4A and 4B can be executed by the controller 110 depicted in FIG. 1.

Thus, through the pre-allocation scheme described above, embodiments of the invention eliminate the delay associated with waiting for the flushing of the master record while maintaining the power-safe property guaranteed by the flushing of the master record to the non-volatile memory. As discussed above, in an embodiment a ready-to-be-written superblock is automatically pre-allocated for each performance critical write process/thread (such as that from the user data manger or for garbage collection). In an embodiment, for these threads/processes, at any given time inside master record, one superblock is designated as the "current" superblock and an additional one is designated "next" so it will be written to when the "current" one is full. In an embodiment, the pre-allocation of these blocks of addresses for these performance critical threads are done automatically, so that as soon as writes from a "current" superblock overflow to a "next" superblock, a new "next" superblock will be allocated and chained after the old "next" superblock that has just been designated "current."

One advantage of various embodiments of the invention is that the performance sensitive threads do not need to wait for the master record to be flushed, as the master record is guaranteed to be flushed before "next" superblock information is discarded, and thus is definitely power-safe. This is because, in various embodiments, a superblock includes thousands of pages and the master record is scheduled to be flushed periodically once several dozens or so operations are completed. The master record can be scheduled to flush by setting a flag when the master record is modified. In some embodiments, a flush can immediately be scheduled by placing the master record in a write execution queue. In these embodiments, the other write requests in the queue may correspond to writes designated for the "next" superblock (now "current" in the to-be-written master record). The queue in one embodiment has a queue depth of 32 and the master record is thus flushed after at most 31 other operations have been performed in the now "current" superblock. Since each superblock typically has thousands of pages in one embodiment, the master record flush will be completed before the operations fill the rest of the now "current" superblock. In other embodiments, the queue depth may be different, but the master record flush can be guaranteed to complete prior to another superblock rotation as long as the queue depth is configured to be less than the capacity of the superblock. For non-performance critical data, on the other hand, an embodiment is configured to be manually triggered to allocate a new superblock when one or more certain conditions are met.

Embodiments of the invention guarantee the storage system to be power-safe and ensure that for any permanent, irreversible media action (like writes and erases to the non-volatile memory), crucial recovery data will be kept around inside the master record until the media action is recognized to be completed successfully. The guarantee may be applicable to the following scenarios:

In an embodiment, there is an erase queue mechanism built into the master record that details what superblock will be erased. The superblock will be removed from the queue only when the erase has been completed successfully. Thus if a power-loss hits while an erase is in progress, the superblock be re-erased on power-up and then removed from the erase queue only when the erase has been completed successfully.

In an embodiment, the master record maintains a record of superblocks that are "open", ones that are currently operated on, before it is even used as explained above. Thus, the controller in an embodiment virtually tracks all superblocks that can possibly be written to by any firmware component (e.g., the user data manager). As further described below in FIGS. 5A and 5B, on power-up, the firmware can scan these superblocks to find the last written page and update various tables (e.g., mapping table, invalid page table, invalid counter table, superblock table, etc.) correctly. One key is that recovery data related to writes to the non-volatile memory (e.g., NAND) is not discarded until the tables are updated in volatile memory and flushed (with the updates) to non-volatile memory successfully.

In an embodiment, the master record also includes "checkpoints" for internal operations such as those related to wear-leveling and garbage collection. In case of power-loss, the embodiment provides these internal operations valuable information on power-up after power is restored, such as: (1) the blocks or superblocks each operation was working on, (2) at which "checkpoint" did it complete successfully, (3) whether to continue or restart from last checkpoint and move on as usual. In some embodiments, the checkpoints can be used in the activity logs to indicate which entries are relevant and which are outdated.

In an embodiment, there is a close queue mechanism built into the master record that lists the superblocks that are waiting to be closed. The close queue ensures that tracking of the superblocks does not end as soon as they are filled up. The tracking cannot end yet because certain system tables may have been updated only in volatile memory to reflect the last operations performed on those filled-up superblocks but those tables have not yet been flushed to the non-volatile memory. In one embodiment, the mechanism will remove superblocks from the close queue only when the necessary updates to the system tables have been flushed to the non-volatile memory successfully.

System Status Recovery

Figure 5A:
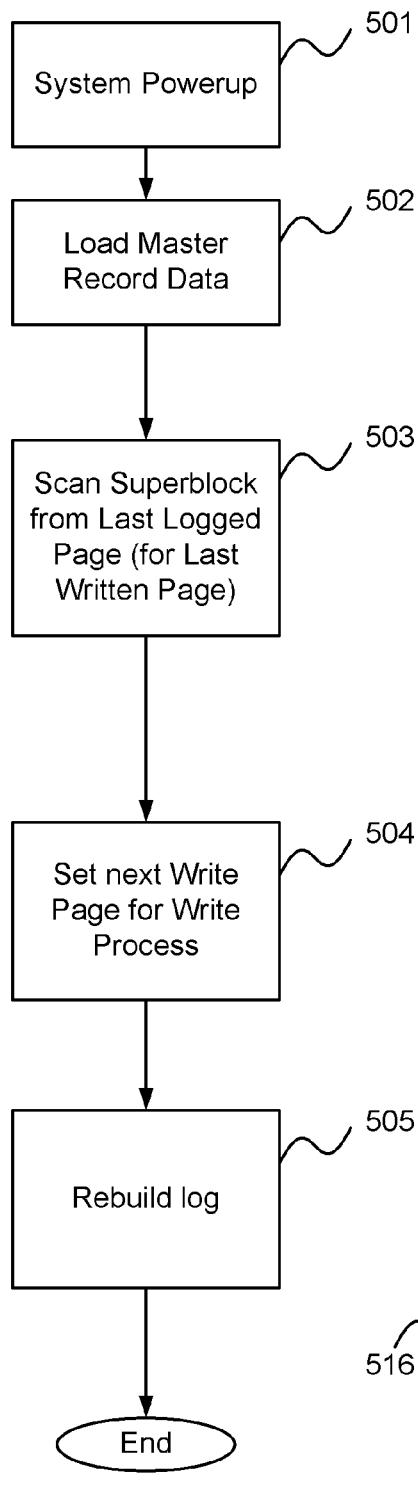
FIGS. 5A and 5B show flowcharts for recovering system status from a master record stored to non-volatile storage.
Figure 5B:
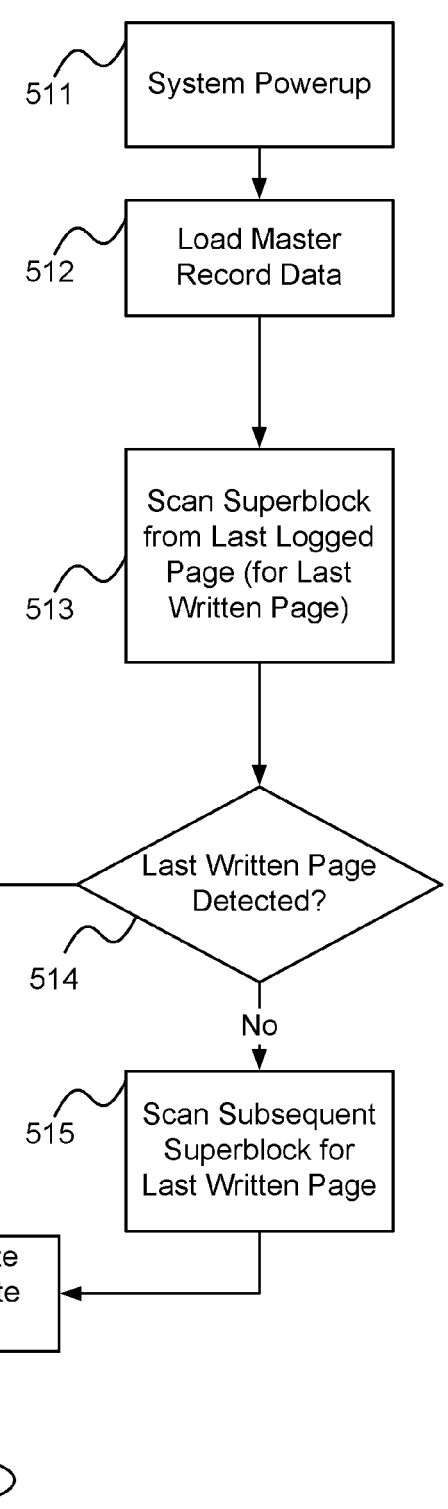

FIGS. 5A and 5B illustrate methods for recovering system write status from the master record. Though described here as referring to system power-up, these techniques could be advantageous any time the system status needs to be loaded from a saved state on the non-volatile memory. FIG. 5A shows a method for recovering system write status corresponding to the master record of FIG. 2A. At block 501, the system is powered up. At block 502, the master record data stored in non-volatile memory is loaded by the controller. At block 503, the controller can check the last logged page (last page on which an associated data operation is logged in non-volatile memory) from the master record and scan the superblock designated for each write process from the last logged page for the last written page. In some embodiments, no record is maintained of a last logged page in the master record, in which case at block 503 the scanning for the last written page would start from the beginning of the current superblock. The master record may maintain a record (e.g., an activity log) logging write activities for internal maintenance purposes. Determining the last-written page enables the controller to designate the address to be used as the next write location for the process. In this way, the system can recover to the last page written by the process even if that location was not stored in the master record. This next write location can be set at block 504 for the process. In one embodiment, at block 505, the activity log is re-built to capture operations that have not been logged (from the last-logged page to the last-written page).

FIG. 5B illustrates the methods for recovering system write status for a master record which designates a previous, current, and next superblock (shown by the example depicted in FIGS. 3A and 3B). As in FIG. 5B, the system powers up at block 511 and loads the master record data at block 512. The master record data can include a reference to the last-logged page for each write process. The last-logged page may be within the superblock designated "previous" or the superblock designated "current." The last-logged page may be from the superblock designated "previous" if for example, the write process proceeds to a new superblock and flushes the master record before the logging process completes logging the previous superblock. The last-logged page may be from the superblock designated "next" if, for example, the write process continued to the next superblock and was logged prior to a successful flush of the master record. At block 513, the superblock corresponding to the last logged page is scanned for the last written page. As the superblock is scanned, the activity on the superblock drive can be recorded in the activity log to rebuild the log so that it is up-to-date with previously un-recorded data operations. At block 514, the system checks whether the last-written page was detected in the scanned superblock. If it was not, then the system can scan the subsequent superblock at block 515. For example, if the superblock that was just scanned is designated previous, the subsequent superblock is the "current" superblock. Likewise, if the scanned superblock is designated "current," the subsequent superblock is the "next" superblock. The last-written page may be in the subsequent superblock because it is possible the system interrupted after the write process began to write to the subsequent superblock but before the rotated superblock allocation was flushed to the non-volatile media. The last-written write location can be set for a write process at block 516. As discussed above, through this process the system can determine the pages which must still be logged (those pages between the last-logged and the last-written pages) to rebuild the activity log and the write processes can continue to write from the last location where the last write actually occurred, even if it is not the "current" superblock.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIGS. 2B, 4A, 4B, 5A, and 5B may differ from those shown in the figures. Depending on the embodiment, certain of the steps described in the example above may be removed, others may be added, and the sequence of steps may be altered and/or performed in parallel. Although this disclosure describes examples in which data are stored in groups of blocks termed superblocks, those skilled in the art will recognize that the various embodiments disclosed are applicable to systems with other memory measurement units such as planes, blocks, pages, sectors, etc. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method comprising:
   writing data for a first write process to a first superblock of addresses in non-volatile memory, the first superblock designated as a current superblock in a master record stored in volatile memory;
   upon writing data to a last address of the first superblock, designating a second superblock of addresses in the non-volatile memory as the current superblock in the master record stored in the volatile memory, wherein the second superblock was designated as a next superblock in the master record prior to be designated as the current superblock;
   initiating a flush of the master record from the volatile memory to the non-volatile memory after the second superblock has been designated as the current superblock in the master record, the flush comprising writing the master record to the non-volatile memory; and
   writing data for the first write process to the second superblock of addresses prior to completing the write of the master record to the non-volatile memory.

2. The method of claim 1, wherein initiating the flush of the master record comprises adding the master record to a write queue for writing to the non-volatile memory.

3. The method of claim 2, wherein a depth of the write queue is less than a capacity of the second superblock.

4. The method of claim 1, further comprising:
   writing data for a second write process to a third superblock of addresses in the non-volatile memory, the third superblock designated as a current superblock for the second write process in the master record;
   upon writing data to a last address of the third superblock, designating a fourth superblock of addresses in the non-volatile memory as the current superblock for the second write process in the master record stored in the volatile memory, wherein the fourth superblock was designated as a next superblock for the second write process in the master record prior to be designated as the current superblock;
   initiating a flush of the master record from the volatile memory to the non-volatile memory after the fourth superblock has been designated as the current superblock for the second write process in the master record, the flush comprising writing the master record to the non-volatile memory; and
   writing data for the second write process to the fourth superblock of addresses after completing the write of the master record to the non-volatile memory.

5. The method of claim 4, wherein the first write process was initiated by a user data manager and the second write process was not initiated by the user data manager.

6. The method of claim 1, further comprising:
   designating the first superblock of addresses as a previous superblock in the master record; and
   designating a third superblock of addresses in the non-volatile memory as the next superblock in the master record.

7. The method of claim 1, wherein the non-volatile memory comprises a plurality of die, and wherein the first and second superblock of addresses each comprise as least one address associated with each of the plurality of die.

8. A storage system, comprising:
   non-volatile memory;
   volatile memory; and
   a controller configured to:
      write data for a first write process to a first superblock of addresses in the non-volatile memory, the first superblock designated as a current superblock in a master record stored in the volatile memory;
      upon writing data to a last address of the first superblock, designate a second superblock of addresses in the non-volatile memory as the current superblock in the master record stored in the volatile memory, wherein the second superblock was designated as a next superblock in the master record prior to be designated as the current superblock;
      initiate a flush of the master record from the volatile memory to the non-volatile memory after the second superblock has been designated as the current superblock in the master record, the flush comprising writing the master record to the non-volatile memory; and
      write data for the first write process to the second superblock of addresses prior to completing the write of the master record to the non-volatile memory.

9. The storage system of claim 8, wherein the controller is configured to initiate the flush of the master record by adding the master record to a write queue for writing to the non-volatile memory.

10. The storage system of claim 9, wherein a depth of the write queue is less than a capacity of the second superblock.

11. The storage system of claim 8, wherein the controller is further configured to:
    write data for a second write process to a third superblock of addresses in the non-volatile memory, the third superblock designated as a current superblock for the second write process in the master record;
    upon writing data to a last address of the third superblock, designate a fourth superblock of addresses in the non-volatile memory as the current superblock for the second write process in the master record stored in the volatile memory, wherein the fourth superblock was designated as a next superblock for the second write process in the master record prior to be designated as the current superblock;
    initiate a flush of the master record from the volatile memory to the non-volatile memory after the fourth superblock has been designated as the current superblock for the second write process in the master record, the flush comprising writing the master record to the non-volatile memory; and
    write data for the second write process to the fourth superblock of addresses after completing the write of the master record to the non-volatile memory.

12. The storage system of claim 11, wherein the first write process was initiated by a user data manager and the second write process was not initiated by the user data manager.

13. The storage system of claim 8, wherein the controller is further configured to:
    designate the first superblock of addresses as a previous superblock in the master record; and
    designate a third superblock of addresses in the non-volatile memory as the next superblock in the master record.

14. The storage system of claim 8, wherein the non-volatile memory comprises a plurality of die, and wherein the first and second superblock of addresses each comprise as least one address associated with each of the plurality of die.

* * * * *